United States Patent [19]

Pryor

[11] Patent Number: 4,460,826
[45] Date of Patent: Jul. 17, 1984

[54] FIBER OPTIC BASED ROBOT CONTROLS

[75] Inventor: Timothy R. Pryor, Tecumseh, Canada

[73] Assignee: Diffracto Ltd., Windsor, Canada

[21] Appl. No.: 200,401

[22] Filed: Oct. 24, 1980

[51] Int. Cl.³ .............................................. G02B 5/14
[52] U.S. Cl. ................................... 250/227; 350/96.25
[58] Field of Search ............... 250/227, 201, 203, 204; 350/96.24, 96.25, 96.26, 96.27

[56] References Cited

U.S. PATENT DOCUMENTS

| 3,636,362 | 1/1972 | Beeman et al. | 250/227 |
| 4,042,823 | 8/1977 | Decker et al. | 250/227 |
| 4,153,834 | 5/1979 | Hayamizu | 250/227 |

Primary Examiner—David C. Nelms
Attorney, Agent, or Firm—Larson and Taylor

[57] ABSTRACT

Optical sensing means, such as an optical image-forming system, is provided on the gripper of a robot and positioned to sense an object to be gripped. A signal, such as an image of the object or a portion thereof, is transmitted from the sensor to a remote detector via a fiber optic cable. A control signal, responsive to the detected signal from the sensor, is generated to actuate the robot arm and gripper to effect gripping of the object. The invention has broad applicability in that it is extremely light-weight and can be mounted on the gripper. The invention has particular adaptability to a fluid-actuated robot: in that instance the entire robot, including object sensing means and actuation means, is non-electrical and can be used in explosive environments.

36 Claims, 14 Drawing Figures

FIBER OPTIC BASED ROBOT CONTROLS

Disclosed is the use of fiber optical cable based control systems for robots and other machines. The fiber optics here disclosed has particular advantages in that it allows a lightening of the control wiring of the robot together with an immunity to noise and an explosion proof nature which can be of use when robots are utilized in munitions, chemical factories and the like.

Also disclosed are many electro-optical sensors useful in robot control and inspection systems including a technique to inspect welds and guide welding automation.

The fiber optic techniques disclosed all provide workable robot controls having the above advantages. They also provide means of transmitting data from optical sensors located on the robot or near the robot in order to help control the robot's motions relative to parts and other operations that are to be performed. They also allow inspection operations to be performed.

This application has, as a reference, copending application Ser. No. 173,370 entitled "Electro-optical Sensors With Fiber Optic Bundles". In that copending application, there is for example, a figure illustrating the use of fiber sensors of the type disclosed in that application for such robot control.

In brief there are two points of view for fiber optics on robots and again other machines. The first is to act as the actual control signal carriers in place of electrical wiring or pneumatics that might be used for same. This means then that the various position sensors, angular encoders, linear encoders and other such sensors of the robot that allow feedback of its particular motions and locations to the control computer are, in the context of this invention, replaced in whole or in part with fiber optic cable. Such a replacement for example, has the outstanding advantage that it remotes all electrical sources which is a big potential use in an explosion type environment, such as a munitions plants—the very ones where one would like to get the people out of the plant and replace labor with robots.

Naturally for the robot system to be all-safe, it has to use a non-electric actuation. A "Cincinnatti" hydraulic robot is an example, as is an "Armax".

Several embodiments of the invention are illustrated in the drawings in which.

Figure 1:
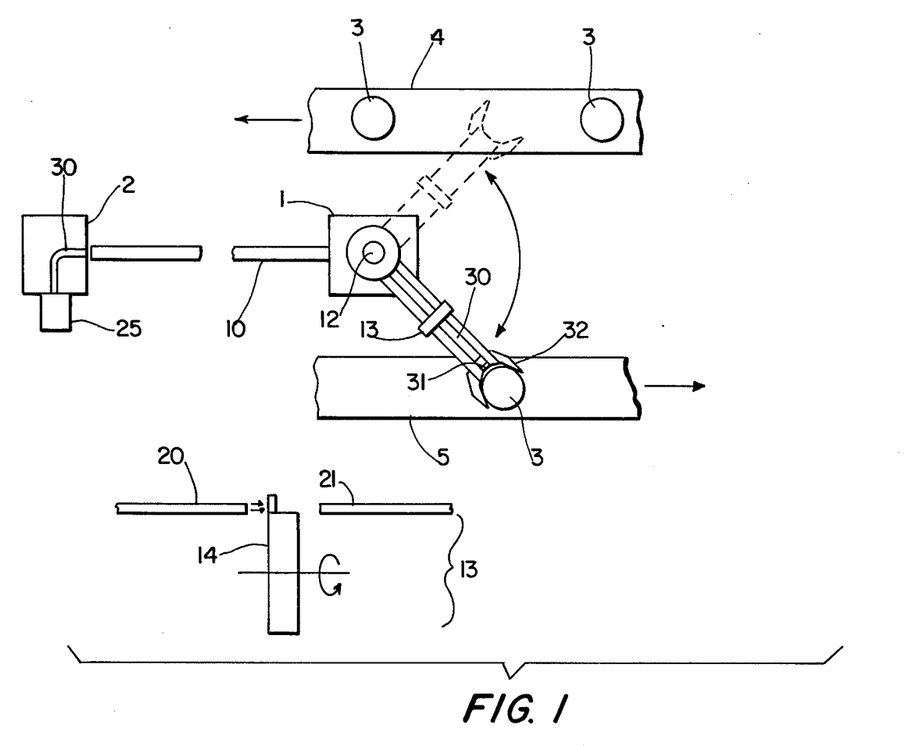
FIG. 1 is a diagrammatic view of a first embodiment of the invention.

Let us consider for the moment, the use of a robot, 1, with its programmable controller 2 shown in FIG. 1, in a munitions plant. The problem is to move a 105 mm tank shell 3 from a moving conveyor 4 and place it on another conveyor 5. As shown in FIG. 1, the control electronics 2 for the robot are located outside of the actual production line 30 feet away, with all data transmission occuring over the fiber optics 10 to and from the varying encoders such as rotational encoders 12 and 13 which are themselves fiber optically remoted. Some of these encoders have been described in copending applications by the inventor. Each of the angular encoders in the joints of the robot together with a linear encoder on the up/down motion of the robot are all encoded remotely via optical sources and sensors. Naturally this has to be a special type of encoder not heretofore available. In addition all position switches etc. such as shown in the copending application are also monitored remotely via fiber optics.

To illustrate this consider rotational encoder 13 in the robot joint. As shown in the inset, a toothed wheel 14, interrupts the light from lamp in controller 2, conveyed over a fiber 20, in group 10. A second fiber 21 returns the light (when not blocked by a tooth segment) to a detector in controller 2. A count of the pulses gives the angular rotation of the toothed wheel of the encoder. A bi-directional system incorporating two or more such fibers in phase quadrature is also useful. In place of wheel 14, a disc with evaporated film radial grids can also be used.

To further illustrate the invention an optical source and matrix array camera system 25 are both remoted also via the fiber optics cable 30 to provide illumination and recognition of the shells such that an image of them (formed by lens 31 in hand 32) can be analyzed to allow sufficient controls to be given to the robot in order to grab the shell properly. This allows the shell to be tracked along the line, even if the shell position or line speed are variant.

There is a wide variation on the type of fiber optics to be used. In cable 30, used to transmit the image of the shell, a coherent type bundle 30 back to the remote controller location, or the sparsely available single guided wave type fibers such as selfoc can be utilized—both very expensive in the lengths mentioned above. A second type of fiber cable can be used are inexpensive incoherent bundles as shown in copending application Ser. No. 173,370, filed July 29, 1980. This actually can be quite sufficient for guiding the unit.

Single fibers such as 20 as well as bundles can be utilized to carry the data back and forth between the encoders and the controller if desired. Even on a robot not in a munitions environment the idea is of use since all of these fiber cables are light and allow the minimum amount of mass to be moved by the robot. They are also noise free in the electronics sense. However, such fibers can have certain changes in their transmission characteristics of at least a few percent due to bending differences. Therefore, digital signals are desirable.

As shown the robot controller first through the remote camera unit sees either the shape, the area or the signature of the shell coming toward it. When the control system says the time is correct, the arm moves forward, continuing to look at the shell as it moves until it is in the position to grab. Here, for example, additional sensors can also be used, as described below. A signal is then sent to the controller that the unit is all the way forward from a fiber optic limit switch which then tells it to move sideways until it again picks up the area. It then lifts the part, closes the gripper 32, which is registered as a count change via fiber optics of the encoder in the gripper and so forth.

Unlike any sort of pneumatic controls, these signals travel instantly. However the hydraulic motion commands cannot travel so fast. In other words, the maximum control, the signals from the robot to the controller are optical/electric which is instantaneous but the signals from the controller to the robot are clearly air, air over hydraulic or hydraulic. This is of course somewhat slower.

The incoherent or quasi-coherent fiber based sensors such as disclosed in copending application Ser. No. 173,370 provide a large amount of sensor locations at a very low cost. For example, as many as 25 can be shared with a single matrix array such as a GE TN2500. As long as the data such as areas is sufficient, this provides a lot of sensing capability. It is of course noted that the array could also be used with coherent bundles such as 30 as well and this will be disclosed further herein. In any case, the advantage of the fibers on the robot is to reduce the weight of the sensing capabilities as well as allow them to be time shared amongst processors located in electrically locations.

Figure 2:
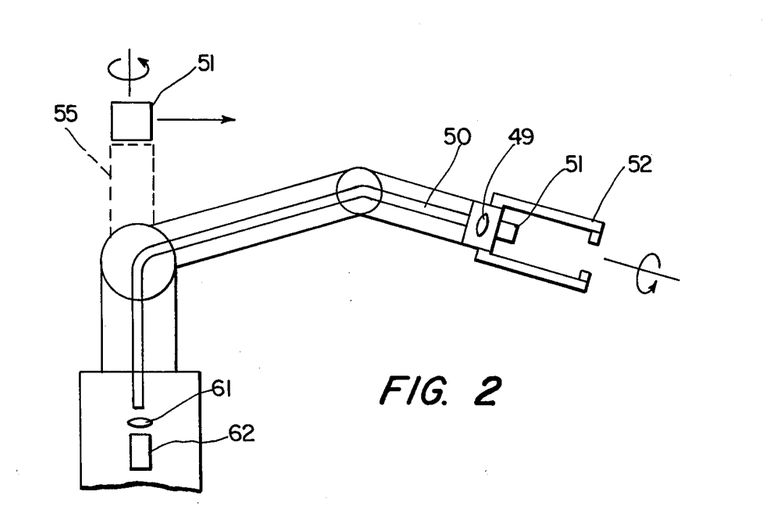
FIG. 2 is a diagrammatic view of a second embodiment of the invention.

FIG. 2 shows a fiber optic image transmitting system comprising lens 49 and coherent fiber bundle 50 utilized with a pentaprism 51 to allow field of view rotation up to 360° while still transmitting an image with the least possible difficulty. This can be located in the rotating hand 52 to look sideways (or at some other angle) or it can alternatively be utilized in the main body 55 (dotted lines) of the robot 60 so that it can rapidly scan 360° around the axis and still allow an image to be seen.

Lens 61 images the end of the fiber bundle 50 onto matrix array 62 located in the robot base. It is noted that one could spin this very quickly in order to create an image scan, although it is noted that the image rotates in this particular version since the fiber is fixed.

Figure 3:
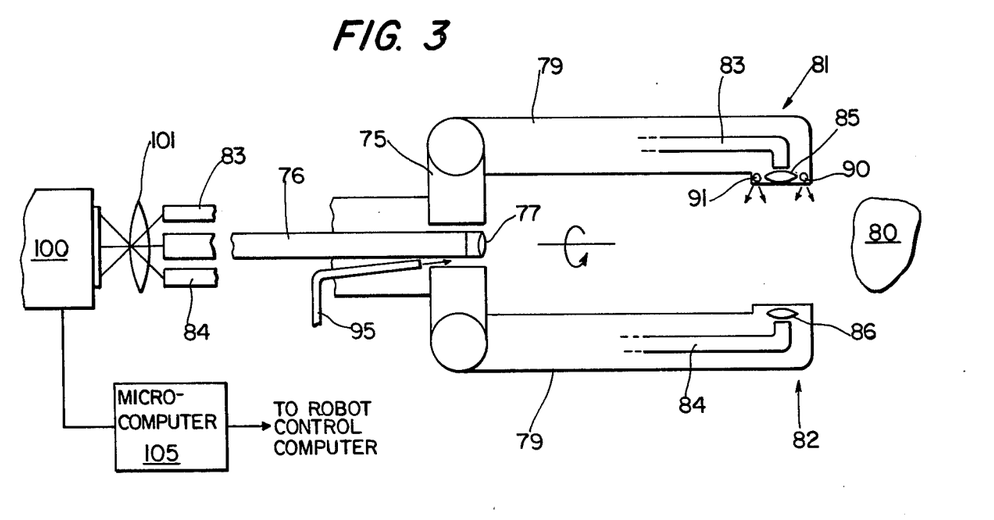
FIG. 3 is a diagrammatic view of a third embodiment of the invention.

FIG. 3 illustrates another embodiment of the invention this time having different types of optical sensors built into the "hand", "gripper", and effector, etc. (75) of the robot. As shown, the first type of sensor utilizes a coherent fiber bundle 76 and lens 77 located right down the middle of the hand which is free to rotate, the bundle and the lens remaining fixed. In this case, no matter what rotational position the hand is in, the part image remains fixed on the fiber although the grippers 79 of course are rotated around it and indeed can be picked off by their image position relative to the part to be grabbed, such as 80.

Only with fiber optics in this way can one easily see right down through the middle of the hand as is required for many operations for maximum accuracy. In this case a coherent waveguide or bundle 76 is utilized to bring the image back to the matrix array located remotely which scans the image of the part and grippers, per the description below.

Also shown in this diagram are two other fiber based sensors, 81 and 82 this time located in the grippers themselves. Each one is of an area or image sampling type utilizing inexpensive, light weight, coherent or incoherent plastic bundles 83 and 84 to bring the coherent, quasi-coherent or incoherent related image back to the matrix array as has been discussed in copending application Ser. No. 173,370. This particular embodiment allows the sensor unit to see the part in its position before the gripping takes place to make sure that it is centered or aligned for example. Wide angle lenses 85 and 86 are utilized in this particular application and lighting can be with a concentric lighting remoted via fibers or via built in LEDs for example 90 and 91. Alternatively, lighting can be in profile from the rear from the other side of the gripper. Indeed any sort of light can be used which accomplishes the task.

In the above example, a common image scanner such as matrix array 100 can be used. Lens 101 images the ends of fibers 76, 83 and 84 onto the array at 3 locations. Every frame scan gives a digital representation of all 3 images into microcomputer 105. Naturally, many more such sensors could also be so shared.

It is also noted that these sensors can see a "signature" of the part, as has been disclosed, which may be used to identify the part to some degree when it is in its correct position for pick-up, etc.

The sensor systems herein can also be used to look at a fixture or second part onto or from which a first part is to be inserted, removed etc.

It is also of interest in the above example to consider a forced air blow-off such as 95 down the axis of the main lens assembly to keep the lens window clear as well as for example the windows of the ones located in the gripper.

These embodiments are all extremely compact and capable of being packed right into the actual mechanical hardware—a desirable capability for imaging type robot control system. This particular invention offers one of the only possibilities for actually doing this in a practical way. The sensing circuitry etc. available today could simply not be reasonably put into limited areas such as the hand shown in FIG. 3.

Figure 4:
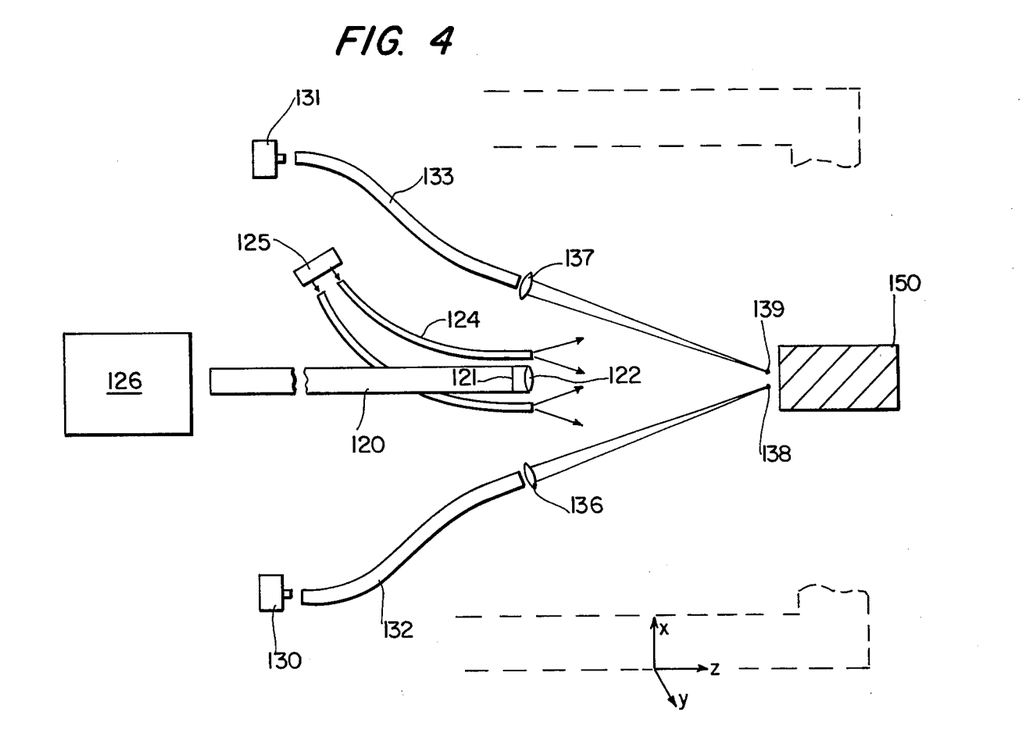
FIG. 4 is a diagrammatic view of a fourth embodiment of the invention.

FIG. 4 illustrates another embodiment of the invention this time considered for possible substitution in the FIG. 3 embodiment for the main sensor coaxial with the hand. In this case the same coherent bundle or waveguide "lens fiber-like" 120 is present to transmit back the image formed on its face 121 by lens 122. In this case, an illumination bundle 124 is located concentric with it. The remote source providing illumination 125 is desirably flashed to maximize signal to noise and avoid blooming of the remote matrix camera 126. It also provides a freeze motion capability.

In addition, like shown that in copending application Ser. No. 34,278, filed Apr. 30, 1979 on triangulation (FIG. 16) additional pulsed light sources 130 and 131, in this case diode lasers, also remoted via fibers 132 and 133, are brought in from the side with the lens assemblies 136 and 137 to focus spots 138 and 139 out into space near the region of the part 150 to be gripped or just outside of the region. These provide a ranging signal as was therein disclosed due to the included angle between the spot projection and the lens axis. In this example the normal illumination source 125 is turned off, the spots project and the 2 axis range and indeed attitude (if a double spot projector is used as is shown), of the part to be picked up can be determined as well as its position in the xy plane. Note that camera 126 and sources 125, 130 and 131 are normally remotely located in the same housing.

It should be noted that picking up parts is not the only thing one can do with such a sensor nor does the sensor need to be in the hand. Indeed the robot can actually be used in this manner to home in on a part and inspect it as well. Such inspection similarly takes place to those described in many other copending applications by the inventor.

Figure 5:
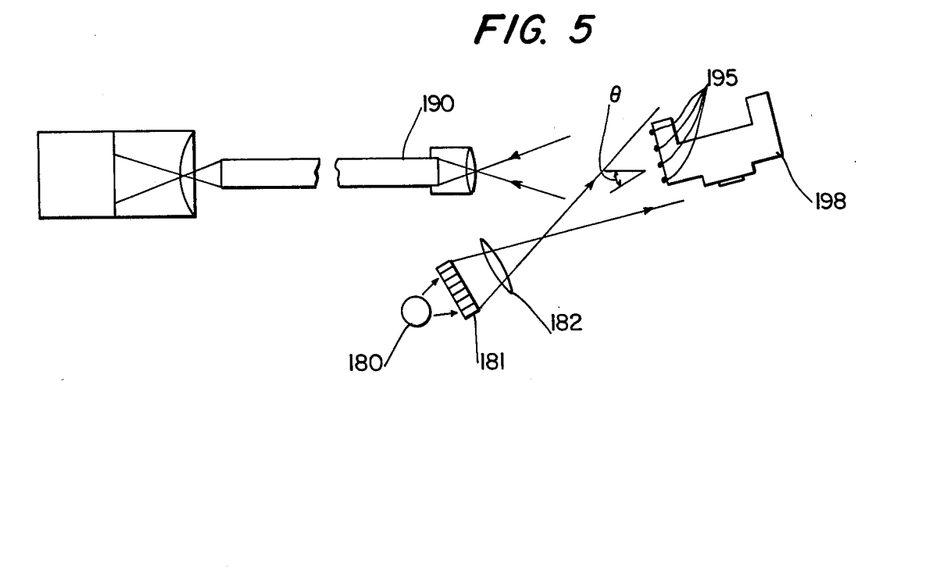
FIG. 5 is a diagrammatic view of a fifth embodiment of the invention.

FIG. 5 illustrates a variation of the FIG. 4 version in which not only is 1, 2 or 4 spots projected on the part, but a whole grid system. The grid projection system comprising source 180, grid 181 and projection lens 182 is located at an angle $\theta$ again to that of the imaging sensor 190 and the camera and/or source can be also remote via fibers or for that matter can be like the sensor unit, built on a much larger fashion and add the source at the hand. This grid projection system provides one or 2-axis grid data 195 which is then analyzed and like other edge data, this criteria is very desirably analyzed by the circuitry shown in copending application Ser. No. 163,290, filed June 26, 1980 (New Photo Detector Array Based Measurement Systems). The grid contours are then, as in that case, FIG. 13, analyzed to give the relative location of the object and its orientation as well as its surface contours relative to the sensing unit and therefore to the robot who is then instructed into the proper manner of picking it up. Naturally by repeatedly taking such data one can find out just exactly where on a complex part one should pick it up—for example, the rear axle pinion flange 198 shown. The complexity is required because in the real world, the parts to be picked up are far more complex than those building blocks that have been used in many lab demonstrations with primitive vision type systems.

Figure 6:
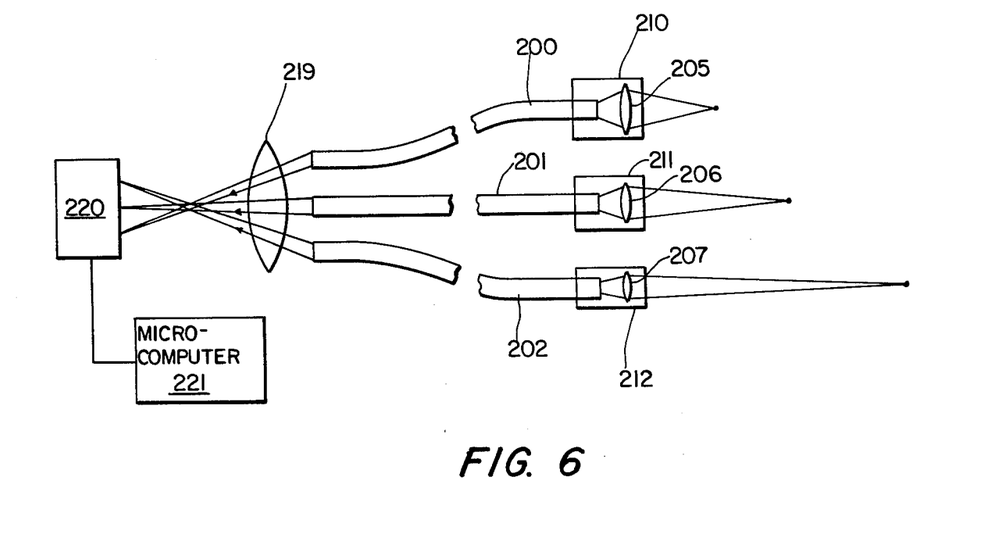
FIG. 6 is a diagrammatic view of a sixth embodiment of the invention.

FIG. 6 illustrates another embodiment of the invention. This time utilizing to the fullest a multiple sensor type approach to which the fiber optic possibility opens up insofar as sharing of the large matrix diode array in the central controller.

As shown, three fiber image transmitters, such as coherent bundle cables 200, 201 and 202, although there could be many more, are utilized in a battery to look out into space ahead of the robot for the purposes of controlling its position relative to parts, fixtures, conveyors or other things. The three separate lenses, 205, 206 and 207 located respectively in housings 210, 211 and 212, one for each fiber cable, are utilized in this particular example. However, each lens is at a different focal length or different spacing such that each of the sensors has a different field of view or a different magnification. The point is that all three are simultaneously read out onto the matrix diode array 220, and analyzed by microcomputer 221. Three diffferent types of views are then available to the array—either different fields of view or different magnifications or both. The array can then select which one it wants to use or can use a predetermined or programmable product of all of them.

Such fibers are preferably used in coherent or quasi-coherent bundles. Plastic fiber types such as Dupon "Corfon", comprised of fibers 0.003" in dia. are preferred for low cost and flexibility.

Naturally the housings could all point in different directions as well and indeed it is conceivable that one could have batteries of such fiber systems in place at all strategic points on the robot or the parts handling system. It should be of course noted that in the latter context, that such sharing of sensors does not just apply to robots but to location on machines in general—perhaps multiple stations on an in-line transfer machine for example or such sensors would monitor the progress of a part through this machine and all be monitored by a single array via fibers. This has been described in a copending application.

Figure 7:
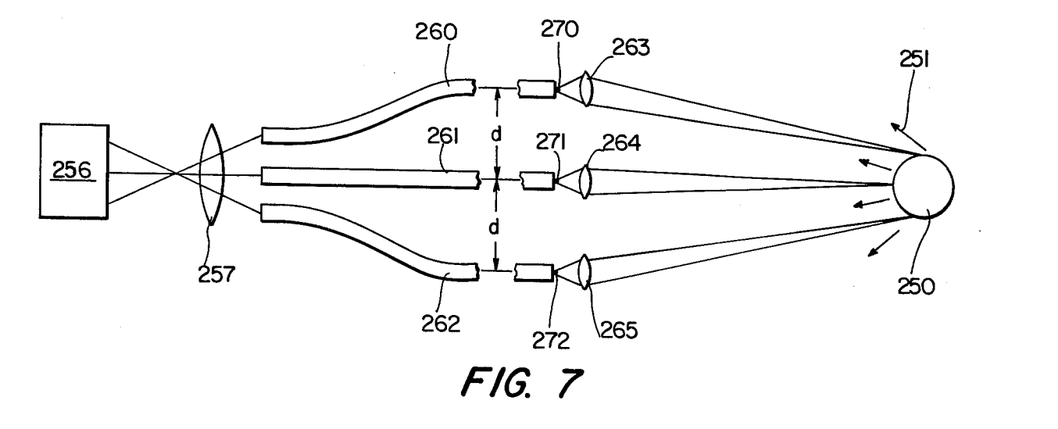
FIG. 7 is a diagrammatic view of a seventh embodiment of the invention.

FIG. 7 illustrates another embodiment of the invention similar to that of FIG. 6, wherein similar coherent fiber sensor bundles are utilized with three identical lens systems, one for each, which bring back the light 251 reflected from object 250 to a matrix photodetector array 256 via lens 257. Through use of the fibers 260, 261, 262, the lens 263, 264, 265 can be spaced a distance 'd' much farther apart than if they had been utilized without the fibers and imaged directly onto the matrix array itself, at most only approximately ½" square in dimension. In this particular case, given the spacing between them, the view of any object out in space is somewhat different from each point just as it is with the human eye spacing of a few inches. While two sensors could be shown to equate to the human stereoscopic case, a third is shown just to show that this is indeed different.

As shown, the images are located vertically on the array so that the image of each is scanned in precisely the same sequence but at different points in time. A microcomputer, as in FIG. 6 provides the analysis means. Clearly the phasing of the image 270, 271, 272 from each gives a definition of both the position of the part in space in the xy plane and its range, just as in the stereoscopic case. Naturally this is of use to the robot coordinate system controls.

Figure 8:
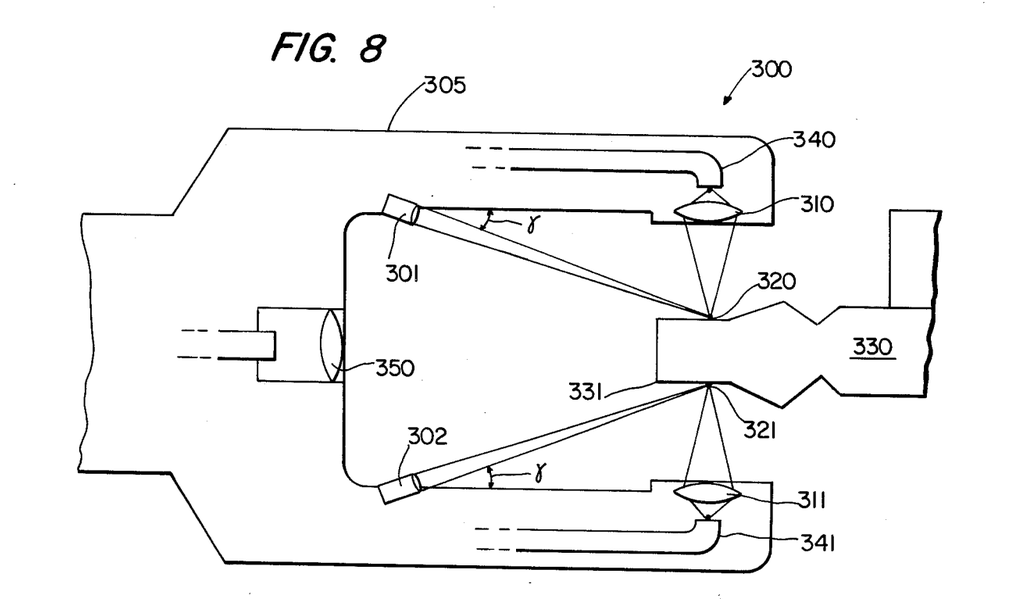
FIG. 8 is a diagrammatic view of a eighth embodiment of the invention.

FIG. 8 illustrates another embodiment of the invention. Again sensors are located in the hand of the robot 300 but in this case the sensors are angulated triangulating types with light sources 301 and 302 to shoot light out at an angle $\gamma$ from the gripper surface of the hand 305. Lenses, 310 and 311, image the spots 320 and 321 resulting when light from 301 and 302 hits part 330. Fibers 340 and 341 carry the spot images back to a central array scan unit (not shown).

This is a variation of the FIG. 4 apparatus. It is noted however that the spot image sensing can be provided as in FIG. 4 using lens 350 down the center axis of the gripper itself like the area array also shown in FIG. 4. This then allows range data to be taken from many different views and perhaps even simultaneously which allows feedback to the robot at the varying points on the part to pick up. For example, consider the complicated part 330 shown which is to be picked up. It is clear that the little step at the end 331, is the place that the gripping is supposed to take place on. In this case the range data provided tells exactly how to grip the part. It is noted that the triangulation based technique of projecting a spot, line or grid pattern and then analyzing it with circuits as described in associated copending applications is the best and most reliable way to do this in plant, as proven by many successful applications. Just looking at the shades of light and dark reflected is not generally usable in plants due to the variations in reflection characteristics.

Light sources 301 and 302 are conviently provided by compact, light weight, pulsed LEDs or diode lasers with suitable spot forming optics. If desired, the sources may be remoted via fibers as well.

It is noted that while FIG. 8 again is shown with compact sensing in the hand because of its ability to be miniaturized, obviously the same sensing equipment does not have to be in the hand of the robot and can be for that matter even off the robot entirely as long as it provides signal to aid in the control of the robot to perform the actions that have been requested.

Figure 9:
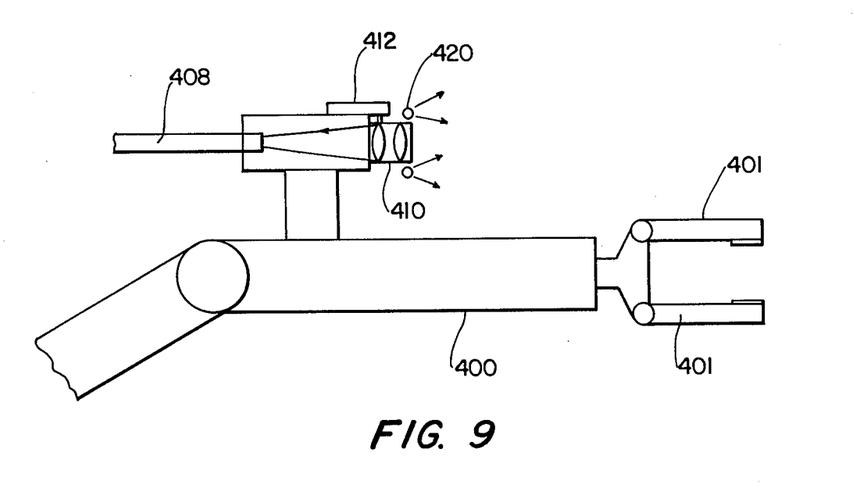
FIG. 9 is a diagrammatic view of a ninth embodiment of the invention.

For example, consider FIG. 9 in which case another type of fiber based sensor is located on the arm 400 of the robot behind the hand 401. In this case, again to keep the unit small and light weight, a coherent fiber optic bundle 408 brings the light back from a lens system which in this case is a zoom lens powered by motor 412 capable of scanning under control of the operating program back and forth to vary the magnification and the field of view of the lens system.

Because the fibers can be relatively small in diameter, the zoom lens itself can be small as well and in fact typical super 8 movie size or less is quite sufficient. Again as shown, this one was covered surrounded with a ring flash unit 420 which is synchronized with the scan of the remotely located matrix array (not shown) to take data concerning objects nearby and then update the zoom position if desired.

Figure 10:
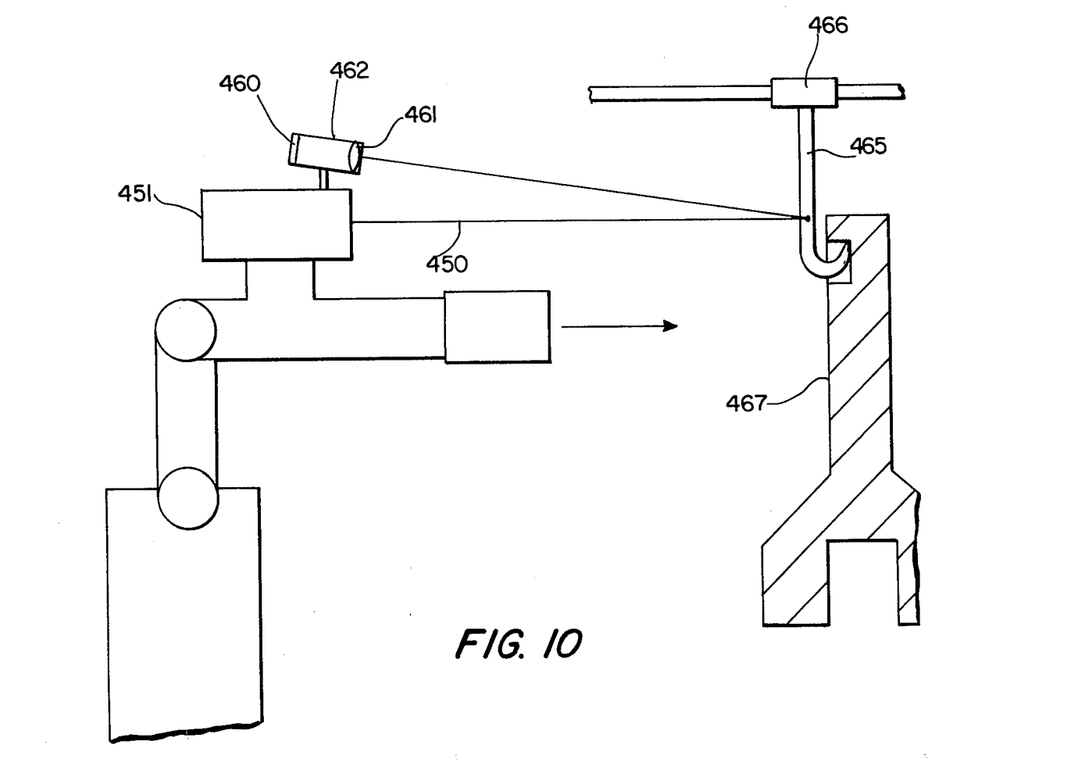
FIG. 10 is a diagrammatic view of a tenth embodiment of the invention.

FIG. 10 illustrates an embodiment of the invention used for ranging and tracking parts such as those on swinging fixtures such as "J" hooks in plants. One of the hardest problems of robots is to hang (or remove) a part on a monorail overhead conveyor having a hook or small platform. Such conveyors are omni present in automotive plants for example and are continually used as justification that a person has to be standing somewhere. The problem is that the man whatever else he's doing, is called on to load the conveyor or unload it and this has been heretofore impossible with robotic techniques.

Many of the technologies in the figures previous can be employed in this case as well. However, this embodiment shows the projection of a laser beam 450 from laser 451 directly out ahead of the sensing diode array and lens system which in this case is shown without the use of fiber optics since it is somewhat larger. This sensing array and lens then moves with the robot toward the J hook 465 on overhead conveyor 466 carrying part 467 to be picked up. Whenever the laser beam hits the J hook, this signal is sensed by the array, range data is taken using the triangulating off-axis spot image position sensing detectors 460 and lens 461 of sensor 462. Optionally other sensors at different angles to the laser beam can also be used.

In this manner, only data from the J hook is accepted and any range data taken is compared to what it theoretically should be in order to make sure that as the robot closes on the conveyor J hook that all data is correct. As the robot gets closer to the J hook it is presumably now completely tracking it through use of its suitable tracking program and is able to pick up the part through use of any of the sensors shown above. It is also noted that the part, rather than the J-hook can be tracked as well.

The use of the fibers on the robots for lightness is a real feature on the small robot such as the Puma (by Unimation Corp.) that are primarily to be used for assembly of small parts and have very little weight lifting capability. The possibility of actually lifting large sensor cameras and their electronics around in space by such a robot completely destroys its ability to perform the work intended and in these cases, the remoting capability using light weight fiber optics here proposed is virtually essential if any more than say one sensor of the optical type is to be employed.

It is clearly a point of this invention to employ many more sensors if required to provide a full fledged capability of the robot. The fact that these may also be shared where desired amongst a single matrix array or TV camera processor allows a low cost also to be obtained, a heretofore unheard of capability.

Figure 11:
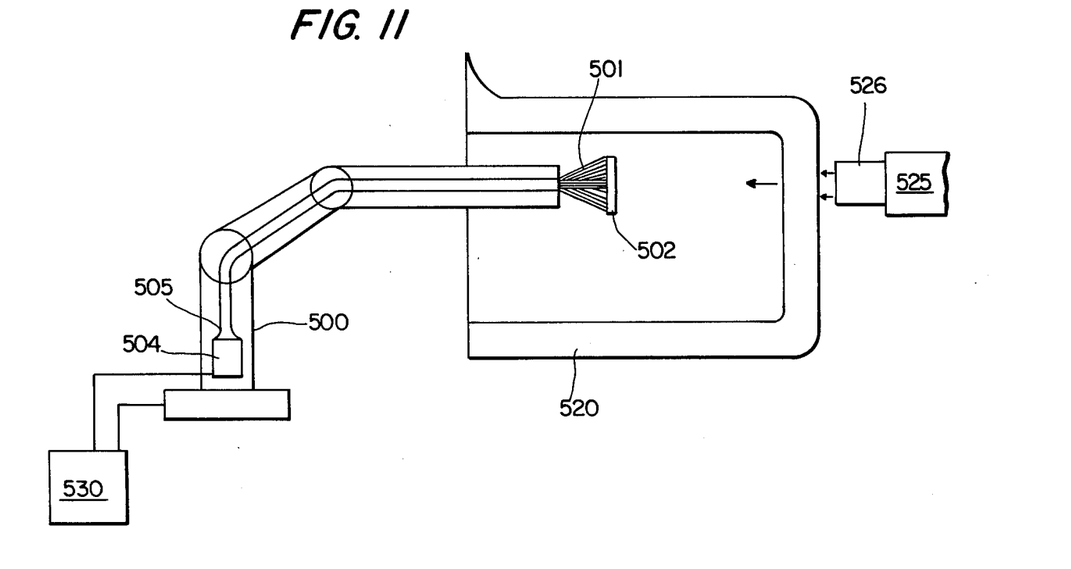
FIG. 11 is a diagrammatic view of a eleventh embodiment of the invention.

FIG. 11 shows an interesting embodiment of the invention used as an automatic X-ray inspection system. Difficulties in modern production of aircraft and automobiles for example are severe in the ability of radiographs to be taken of parts. Often times this is an extremely lengthy and manual labor consuming business and because of this there are many parts that should be radiographed for example that are not simply because of the difficulties. Even when attempts are made, it is so error prone that it's often inconsequential.

As shown, a robot for such purposes 500 is equipped with a fiber optic bundle receiver 501 as described heretofore. This is a coherent bundle which has been coated with a material 502 which emits light when X-rays hit it such as calcium tungstinate or preferably yttrium activated gadalinium sulphide which emits a green light when hit by X-rays. The fibers 501 then carries the data from the X-ray intensity hitting it back to a central control area where it is imaged onto an enhanced photo diode array or if ultimate sensitivity is required, an image intensified Vidicon 504, which is however a much more expensive and difficult thing to keep running in plants. (Alternatively, a X-ray sensitive diode array can be located right in the robot hand.) The face of the Vidicon is shown bonded directly to the opposite end of the bundle 505.

The actual configuration of the receiving fibers in the version shown is in the version of a fan approximately 2 inches in width. Other configurations such as round and multiple line fans etc. are also possible in any way that is desirable to arrange the fibers. In practice the part 520 is brought into position and the robot is actuated to go to different positions on the part and hold the X-ray detector in position. A fixed X-ray source behind the part maybe used, however, for maximum flexibility, a second robot 525 with, for example, a 3 KEV X-ray source 526 and collimator is utilized. The second robot essentially is programmed to point the X-ray source at the first robot which is pointed to receive it. Naturally all pointing and receiving is done aimed through the portion of the part of interest.

If we consider the part shown, which is an automatic transmission case, this is an important part to radiograph since aluminum can have porosity which can cause leaks in the case and yet it is typically not able to be inspected. In this particular case, the robot can actually go inside the case with the simple light weight sensor as here described with the robot X-ray source located on the outside. The combination of the two robots and their ability to rotate the sensor or source units and move it sideways as well allows a complete scan of the walls of the part to be maintained.

Similarly on engine blocks, it is possible to stick the sensor unit down inside the cylinder bores and aim it sideways through different parts of the casting as desired. This is all done automatically under program control and can be changed by simply changing the program for the robots in microcomputer 530.

It is noted that while the fiber optics as before bring considerable advantage in the ability to tailor the image, size and sensitivity and remoteness. However, it is possible, particularly with the new compact Reticon SFX X-ray sensitive photo diode array to locate it right at the end of robot Puma arm as well. In this case electrical signals are brought back.

Naturally when a void is present in a piece of metal, this void shows brighter than otherwise. Some other types of defects showed darker than their surroundings as well.

The X-ray inspection robot shown in FIG. 11 can also be used for the purpose of inspecting spot welds on car bodies. This is a notorius problem where other robots or manual welders are used but they often don't hold. One large motor company for example spends over 2 million dollars every year just in scrap costs to tear down a percentage of the bodies and check the welds destructively.

Car manufacturers have been looking for a way to do this non-destructively and the embodiment of the invention here shown accomplishes this.

The robot is located at the side of the line with the X-ray photo diode array detector or fiber remoted sensor as described. The car body location in space is well known to the central computer but additionally can be optically sensed by many of the sensing devices shown above.

Figure 12:
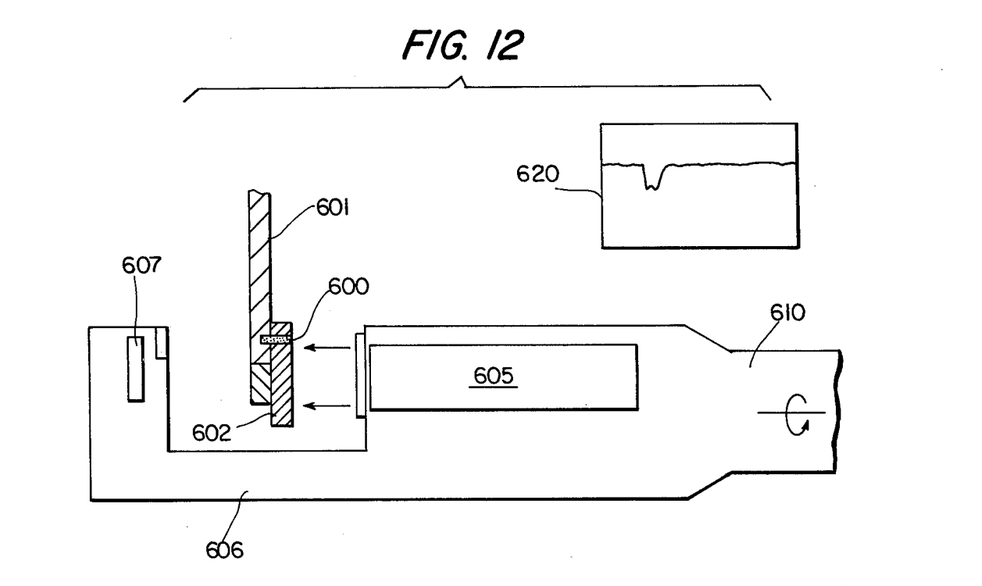
FIG. 12 is a diagrammatic view of a twelth embodiment of the invention.

FIG. 12 illustrates the inspection of a typical weld 600 between 2 sheet metal sections 601 and 602. The X-ray source 605 is located on the same "C" frame 606 unit as the X-ray sensing unit 607. The frame 606 is rotated by robot arm 610 and moved in behind the door frame or any other point that has been welded. A typical detector signature 620 is looked for of a good weld. A photo diode array based sensor unit is the only one rugged enough to actually withstand the forces required. It is noted however that to increase the inspection rate, it may be desired to have multiple sensors, one from each portion of the weld area together with a broad X-ray source possibly held by another robot. In this way several welds at once can be done and the suitable tracking mechanisms are done in order to track the body while these welds are checked so that there is no loss of positional data and that no overly large X-ray fluxes are required. Defects looked for are typically voids and non bonded areas. It is apparent that the same concepts here hold true also for inspection of honeycomb panels and many other different devices where sub-surface defects are desired to be seen.

The "C" frame approach is much like the robotic body welder configuration itself and is very compatable with the programming threreof—a big advantage.

A variation in FIG. 5 provides a method of determining part orientations and locations relative to the robot arm and is particularly of value when the part is being transported on a conveyor or other means and is to be somehow operated on by the robot such as picked up or welded etc.

A grid such as shown in FIG. 5 is projected onto the part. This grid can be of the bar or grill type but further could simply be composed as shown of a series of dots. Ideally such dots of high contrast can be projected via laser beam for example and the projection could be sequential or all at once.

The dots are projected on the part as it comes down a conveyor. Since the part is of complex shape, the dots of course fall on different positions. However, since one knows that the dots are always being projected parallel, the camera unit located on the robot or remoted as is desirable in many cases via fiber optics, as shown in a copending applications, then is able to look at the distribution of the dots on the part and determine not only what part it is, but its orientation.

This is of course a triangulation type system and the principle difference here is that the dots are being projected from an external reference rather than on the robot itself. This sort of fan or sheet of dots allows the very high contrast to be made since a lot of power can be put into the dot and this is helpful for big parts that are dark in color such as cylinder head castings for example. It also provides a large angular separation between the camera located on the robot and the dots being projected from above or for that matter from the sides etc. This allows good resolution of the part shape to be made.

Note too that pulsed diode lasers make an excellent source for this since one can literally pulse them at the frame rate of the camera and this very rapid sensing using circuitry disclosed in a copending application is disclosed. It would be very easy to have a grid of these for example and yet contribute enough power onto the part to where one could make sense out of it.

In the FIG. 4 device for example, the fiber remoted matrix array can be replaced with a circular photo detector array such as a Reticon 720C. In this case, the whole image is not scanned, just a circular section. However, this circular zone is scanned at very high rates (500–40,000 scans/sec.) and can therefore be used to determine if an object has entered the field of view of the lens/circular array combination and by detecting which detector of the array has picked up a return signal, from what direction.

All other lens/matrix versions of this invention can use the same approach. As mentioned above, the array can also be located directly with the lens rather than remoted via fiber optics. In this case the circular array would be located at position 121 in the FIG. 4 example. Data may then be transmitted electrically rather than by fiber, if desired.

Figure 13A:
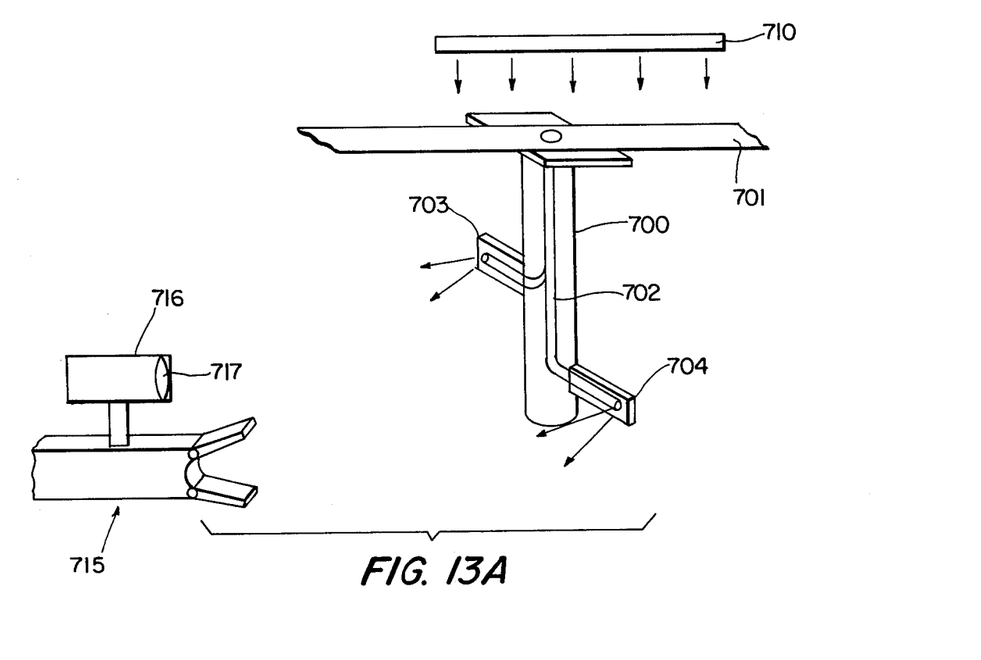
FIG. 13A is a diagrammatic view of a thirteenth embodiment of the invention.
Figure 13B:
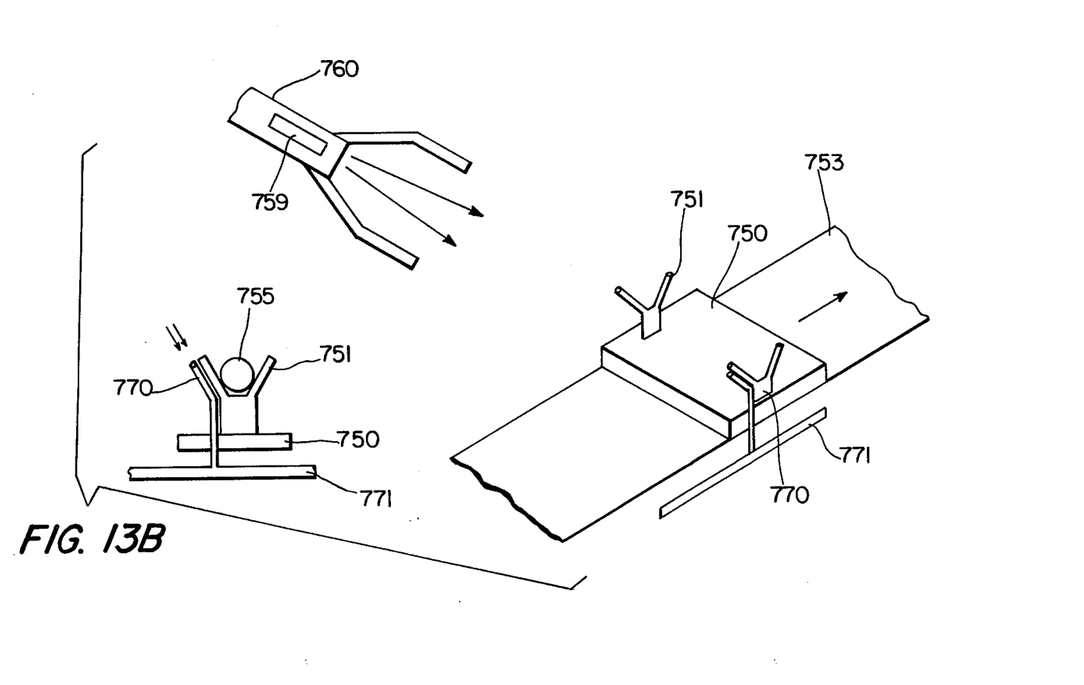
FIG. 13B is a diagrammatic view of a fourteenth embodiment of the invention.

FIG. 13 illustrates another fiber optic version of the invention however for use external to the robot or other automation. Consider the monorail J-hook tracking example of FIG. 10. In this case it was assumed that the J-hook was totally "unco-operative" and all light source and sensing hardware was on the robot.

Two examples are discussed. The first utilizes active lighting of the monorail carrier in at least the zone in which robotic actions are required. The second (FIG. 13B) is much the same but with active detection. While shown relative to monorails, the same concepts apply to all multi fixture conveyance systems such as recirculating pallets, etc. lift and carry walking beams and the like, having numerous moving and fixed rests, also can benefit.

FIG. 13A illustrates the basic situation. A J hook monorail conveyor arm, 700, is travelling on conveyor 701 and is to be approached by a robot 715 in order to pick parts off or put parts on (parts not shown for clarity).

There are two posts on this particular hook and each of the posts has an illuminated portion provided by fiber bundle 702 running down the center of the J hook with branches (via fiber bundle) to each hook providing illumination is shown from point 703 and 704. The particular fiber bundle in question is an inexpensive plastic type fiber bundle of the Corfon type and is readily mountable down the tubular inside of the J hook weldment.

Over a certain section of length L the fiber is illuminated by a linear light source 710. It is this section L over which the robot is to use the guidance provided by the lights in the J hook. The reason for utilizing the fiber optics in the J hook is that no power connections need to be made, which would not be the case if there were lights etc. in the J hook unit. In this way, a very simple system at low cost is provided.

In operation, the robot 715 approaches the J hook and the sensor 716 which in this case is comprised of an imaging forming lens 717 and a matrix array 718 hooked to a microcomputer not shown, can immediately track the point 703 and 704 as they enter the lit up zone of length L. This makes a far easier tracking system than was shown in FIG. 10 where the J hook was totally uncooperative. The matrix array signal needs merely to find 703 and 704 and home on them in order to pick the part off or deposit it on. Naturally other auxilliary lighting from the robot etc. can be provided as well as other sensors in the grippers as has been discussed in the previous embodiments to assist in the final gripping and ungripping of the parts. Even other points on the J hook besides 703 and 704 can be illuminated if this assists in the actuation of the robot and it is considered that each particular J hook pallet or whatever the moving carrier type of conveyor would be would have its illumination of the type provided by the fibers herein designed for the specific task of loading it or unloading it automatically via robot or other means according to this invention.

It is also anticipated that a further point in the conveyor where the J hooks are empty, blow-offs etc. would be provided to keep the point 703 and 704 as well as the entry point on the top of the light from light 710 clean such that they would not build up dirt and become inoperable.

It is also possible according to this invention, to have the light source L pulsed in a mode that would be rapidly discernable from other background lighting by the detector 718.

FIG. 13B illustrates another version of this invention essentially operating in reverse. In this case a pallet 750 with V fixture 751 to receive a cylindrical part such as a rear axle 755 is moving on a recirculating pallet conveyor 753. The robot 760 contains a projection light source such as a diode laser and collimating optics 759.

As each of the pallets comes by the zone for loading or unloading a transparent lucite section or alternatively fiber bundle 770 picks up light from the robot's light source 759 and transmits it to a long linear detector 771 located along the bottom of the pallet and fixed to the conveyor base. Over the total length 771 corresponding to the length L in FIG. 13A, the sensing of the light from 759 at the points as shown on the right side of the fixture can be determined. Naturally another similar detector could be located on the other side to determine whether light was hitting the other V.

It is thought that the reading of the detector 771 and the frequency of a modulated source 759 to guard against background noise. Naturally, when the light from the robot source 759 hits the pallet, one knows that the robot is headed toward that fixture at least within certain limits. This is virtually the exact reverse of the FIG. 13A and either one has its particular advantages although it is generally thought that the FIG. 13A version is superior since the imaging system can not only image the spots of light, but also other things in the field of view wherein in the system as shown in 13B is pretty much dedicated just toward homing in on the V's of the pallet fixture.

Naturally, once the loading operation is performed, the robot then can track the next pallet in the same manner.

A further variation on the scheme of FIG. 13 is to have the fixture stationary (at least for some time period, as on a lift and carry transfer) rather than in continuous motion. In this case, a single robot can come up to each fixture, illuminate the fiber ends and detect each location in turn. Both light source and sensor can be on the same robot, or an external source can be used with the sensor on the robot.

It is of further interest to consider the circuitry that is used with the matrix and linear arrays of this invention. This has been shown in a copending application "New Photo Detector Array Based Measurement Systems" and contains many circuits for finding edges, rotating coordinate systems and finding centroid locations of spots as required by this particular invention.

Copending invention Ser. No. 15,792, now U.S. Pat. No. 4,305,661 (Method and Apparatus for Determining Physical Characteristics of Object Outer Surfaces) also includes floating threshold techniques which also can be of use in finding edges in variant light fields.

It is of considerable interest too in this invention that one might use pulsed sensors or modulated sensors with the light source demodulated at the same frequency to guard against background noise.

Suitable spot position detectors are not only linear, matrix or in some cases, circular diode arrays but also analog spot position detectors such as the UDT SC-10 which is a 2 axis detector or the LSC series one axis detectors. Both of these, with their analog circuitry, can definitely be utilized in place of for example, detector or fiber of FIGS. 4 or 8.

It should be noted that it is within the purview of this invention to make the J hook fixture of FIG. 13A or the pallet V fixture of FIG. 13B, or any other similar fixture according to this invention, out of materials which themselves conduct light for example, Teflon and many of the other plastics type compounds sufficiently conduct light to be quite usable themselves without the requirement for fiber optics or other special conduits in the mode of operation shown. Other ones can be ceramics which of course are a good reference fixture base and other similar things.

It is further noted that all of the above embodiments can also be built with image sensors such as linear, circular or matrix photo diode arrays directly on the robot hand, arm etc. rather than remoted via fibers. Additional resolution results At an added cost in weight (and money, if sharing of many sensors on one array could have been used in the fiber case).

What is claimed is:
1. In a method of controlling a robot, said robot having a moveable arm, a gripper mounted on said arm, and means for actuating said arm and said gripper for gripping an object, said method comprising:
providing sensing means for sensing an object to be gripped by said gripper, said sensing means comprising means for generating a sensing signal responsive to the sensing of an object;
providing detector means for detecting said sensing signal;

transmitting said sensing signal to said detector means;
generating a control signal responsive to said detected sensing signal; and
transmitting said control signal to said actuating means to effect gripping said object,
the improvement being the providing of a plurality of discrete optical sensing means which generate a plurality of optical sensing signals and the mounting of the discrete sensing means on said gripper, the locating of said detector means remote from said arm and gripper, and the transmitting of the plurality of optical sensing signals by a fiber optic cable to the detector means.

2. A method according to claim 1 further comprising providing light source means on said gripper element for directing light onto said object.

3. A method according to claim 2 wherein said light source means comprises a fiber optic cable for transmitting light from a source remote from said arm and gripper.

4. A method according to claim 1 and further including the forming of a plurality of images of portions of said object and the transmitting of the plurality of images of said object to said detector.

5. A method according to claim 4 further comprising projecting a pattern of light onto said object whereby said image of said object comprises an image of said pattern of light.

6. A method according to claim 5 further comprising providing on said gripper means for projecting said pattern of light onto said object.

7. A method according to claim 6 wherein said pattern is a grid.

8. A method according to claim 4 wherein said gripper is rotatable about the longitudinal axis of said arm and further including the mounting of one of said optical imaging means on said longitudinal axis.

9. A method according to claim 1 wherein said detector means provided for detecting comprises a single image scanning device.

10. A method according to claim 9 wherein said image scanning device provided for detecting comprises a photodetector array.

11. A method according to claim 4 wherein a plurality of images of substantially the same scene at different magnifications are transmitted over said fiber optic cable.

12. A method according to claim 6 wherein said light pattern projecting means comprises a fiber optic cable and a light source remote from said arm and gripper.

13. A method according to claim 4 wherein said image is formed by directing X-rays onto said object, said sensing means comprising a material capable of generating light when exposed to X-rays.

14. A method according to claim 14 wherein said image forming means comprises a lens and the rotating of the viewing axis of said lens.

15. A method according to claim 1 further comprises directing a stream of air onto said optical sensing means to keep said sensing means clean.

16. A method according to claim 4 wherein said image forming means comprises a zoom lens and wherein images of varied magnification of said object are transmitted to said detector.

17. A method according to claim 4 wherein said object is illuminated by a flashed source of light.

18. In an apparatus for controlling a robot, said robot having a moveable arm, a gripper mounted on said arm, and means for actuating said arm and said gripper for gripping an object, said apparatus comprising:
optical sensing means for sensing an object to be gripped by said gripper, said sensing means comprising means for collecting a sensing light signal from light received from the object;
detector means for detecting said sensing signal;
means for transmitting said sensing signal to said detector means;
means for generating a control signal responsive to said detected sensing signal; and
means for transmitting said control signal to said actuating means to effect gripping said object,
the improvement wherein said sensing mean comprises a plurality of discrete optical sensing means mounted on said gripper, wherein said detector means is located remote from said arm and said gripper, wherein said sensing signal is a plurality of optical signals, and wherein said optical sensing signals transmitting means comprises a fiber optic cable.

19. Apparatus according to claim 18 further comprising light source means on said gripper element for directing light onto said object and which light is subsequently collected by said sensing means.

20. Apparatus according to claim 19 wherein said light source means comprises a fiber optic cable for transmitting light from a source remote from said arm and gripper to the object.

21. Apparatus according to claim 18 wherein said optical sensing means comprises means for forming an image of a plurality of portions of said object.

22. Apparatus according to claim 21 further comprising means for projecting a pattern of light onto said object whereby said image of said object comprises an image of said pattern of light.

23. Apparatus according to claim 22 further comprising means mounted on said gripper means for projecting said pattern of light onto said object.

24. Apparatus according to claim 23 wherein said pattern is a grid.

25. Apparatus according to claim 21 wherein said gripper is rotatable about the longitudinal axis of said arm and wherein one of said optical sensing means for forming an object image comprises an optical imaging means mounted on said longitudinal axis.

26. Apparatus according to claim 18 wherein said detector means comprises a single image scanning device.

27. Apparatus according to claim 26 wherein said image scanning device comprises a photodetector array.

28. Apparatus according to claim 21 further comprising means for transmitting a plurality of images of substantially the same scene at different magnifications over said fiber optic cable.

29. Apparatus according to claim 23 wherein said light pattern projecting means comprises a fiber optic cable and a light source remote from said arm and gripper.

30. Apparatus according to claim 21 further comprising means for directing X-rays onto said object to form said image, said sensing means comprising a material capable of generating light when exposed to X-rays.

31. Apparatus according to claim 18 wherein said robot comprises fluid means for actuating said arm and gripper, wherein said robot and object are located within an enclosed explosive environment, and wherein said detector means is located outside said explosive environment.

32. Apparatus according to claim 21 wherein one of said optical sensing means comprises a lens and wherein the viewing axis of said lens is rotatable.

33. Apparatus according to claim 18 further comprising means for directing a stream of air onto said optical sensing means keep said sensing means clean.

34. Apparatus according to claim 18 wherein said optical sensing means comprises a window for protecting the optical elements of said sensing means.

35. Apparatus according to claim 21 wherein said image forming means comprises a zoom lens whereby images of varied magnification of said object are transmitted to said detector.

36. Apparatus according to claim 21 further comprising a flashed source of light for illuminating said object.

* * * * *